Patented Jan. 21, 1941

2,229,200

UNITED STATES PATENT OFFICE 2,229,200

AZO DYESTUFFS AND PROCESS FOR THEIR MANUFACTURE

Walter Wehrli, Basel, Switzerland, assignor to Sandoz, Ltd., Basel, Switzerland

No Drawing. Application March 31, 1938, Serial No. 199,287. In Switzerland April 3, 1937

4 Claims. (Cl. 260—207)

The present invention relates to new chromatable azo dyestuffs and to a process for their manufacture.

It has been found that new chromatable azo dyestuffs can be obtained by coupling diazotized mononitro-o-aminophenols with 1-hydroxy-2-acylamino-4-alkylbenzenes.

As diazo compounds the following products can e. g. be used: 1-hydroxy-2-amino-4-nitrobenzene, 1-hydroxy-2-amino-5-nitrobenzene, 1-hydroxy-2-amino-4-nitro-6-methylbenzene, 1-hydroxy-2-amino-4-nitro-6-chlorobenzene, 1-hydroxy-2-amino-4-nitrobenzene-6-sulphonic acid, 1-hydroxy-2-amino-4-chloro-6-nitrobenzene, 1-hydroxy-2-amino-6-nitrobenzene-4-sulphonic acid. The acyl-amine group contained in the ortho-position to the hydroxy group of the coupling component contains the radical of an acid such as formic acid, acetic acid, halogenated acetic acid, alkoxyacetic acids, aryloxyacetic acids, propionic acids, butyric acids, oxalic acid, benzoic acid and its substitution products, phthalic acids, cyclohexenyl carboxylic acid and others. The alkyl group contained in the para-position to the hydroxy group of the coupling component can be for instance the following: methyl, ethyl, n-propyl, isopropyl, n-butyl, iso-butyl, secondary butyl, tertiary butyl, n-amyl, isoamyl, secondary amyl, tertiary amyl and also higher molecular aliphatic and cyclic alkyl radicals. The coupling is carried out in the usual manner in presence of acid binding agents such as bicarbonate, soda ash, sodium hydroxide, ammonia, lime milk, magnesia or pyridine. If desired these acid binding agents can be combined together.

The dyestuffs obtained according to the present process dye wool, when afterchromed, in full brown shades of excellent fastness properties. Some of them are especially suitable for dyeing wool according to the so-called metachrome process.

By treating the dyestuff with heavy metal yielding compounds, they become transformed into water-soluble metal complex derivatives, which can be used for dyeing animal fibres or leather.

As compared with the dyestuff described in the German specification 351,001 and obtained from diazotized picraminic acid and 1-hydroxy-2-acetylamino-4-methylbenzene, the new dyestuffs possess a much better fastness to light.

One object of the present invention is, therefore, the process for the manufacture of new azo dyestuffs, consisting in coupling mononitrated ortho-aminophenols with 1-hydroxy-2-acylamino-4-alkylbenzenes.

Another object of the present invention is the dyestuffs of the general formula

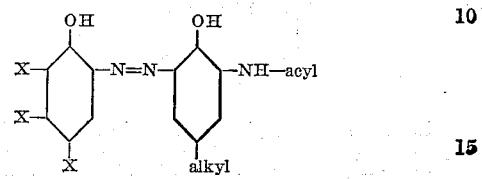

wherein X stands for hydrogen, nitro, halogen, sulpho, alkyl and wherein at least one of the X represents a nitro group.

The following examples, without being limitative, illustrate the present invention, the parts being by weight:

Example 1

23.4 parts of 1-hydroxy-2-amino-4-nitrobenzene-6-sulphonic acid are diazotized with 6.9 parts of sodium nitrite and 22 parts of hydrochloric acid and coupled in presence of an acid binding agent with 16.5 parts of 1-hydroxy-2-acetamino-4-methylbenzene. The isolated and dried dyestuff is a dark powder, dyeing wool from an acid bath in yellowish brown shades, which become full brown on after-chroming.

By replacing in this example the 1-hydroxy-2-acetamino-4-methylbenzene by 1-hydroxy-2-benzoylamino-4-methylbenzene, a dyestuff will be obtained that yields on wool and after chroming a more yellowish brown shade.

Instead of the coupling components used in this example, it can be used 1-hydroxy-2-oxalylamino-4-methylbenzene or the phthalaminic derivative obtained from 1-hydroxy-2-amino-4-methylbenzene and phthalic acid anhydride, whereby similar dyestuffs will be obtained.

Example 2

15.4 parts of 1-hydroxy-2-amino-4-nitrobenzene are diazotized with 6.9 parts of sodium-nitrite and 25 parts of hydrochloric acid and coupled in presence of pyridine with 16.5 parts of 1-hydroxy - 2 - acetamino - 4 - methylbenzene. The isolated and dried dyestuff is a dark powder, dyeing wool from an acid bath in brownish shades that become, on afterchroming, full brown. The dyestuff is especially suitable for dyeing wool according to the so-called monochrome process.

By using in this example as diazo compounds 1-hydroxy-2-amino-4-nitro - 6 - chlorobenzene or 1-hydroxy-2-amino- 4 - nitro - 6 - methylbenzene, dyestuffs with similar properties will be obtained.

Similar dyestuffs are also obtained by using in this example as coupling component 1-hydroxy-2-formylamino-4-methylbenzene or 1-hydroxy-2-oxalylamino - 4 - methylbenzene or the phthalaminic derivative obtained from 1-hydroxy-2-amino - 4 - methylbenzene and phthalic acid anhydride.

*Example 3*

23.4 parts fo 1-hydroxy-2-amino-6-nitrobenzene-4-sulphonic acid are diazotized with 6.9 parts of sodium nitrite and 22 parts of hydrochloric acid and coupled in presence of an acid binding agent with 22.7 parts of 1-hydroxy-2-benzoylamino - 4 - methylbenzene. The isolated and dried dyestuff is a dark powder, dyeing wool from an acid bath in brown-violet shades, that become dark brown on afterchroming.

What I claim is:

1. The chromatable azo dyestuffs of the general formula

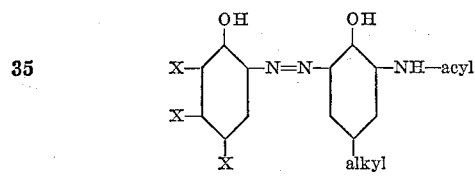

wherein one X stands for a nitro group, the other X represents a member of the group consisting of hydrogen, halogen, alkyl and sulpho, which are in dry state dark powders easily soluble in water, dyeing animal fibres from an acid bath in brown shades, which, when after-chromed, possess excellent fastness to light.

2. The chromatable azo dyestuff of the formula

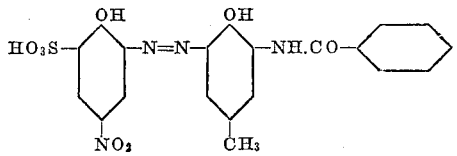

which is in dry state a dark powder easily soluble in water, dyeing animal fibres from an acid bath in yellowish-brown shades, which, when afterchromed, become full brown and possess excellent fastness to light.

3. The chromatable azo dyestuff of the formula

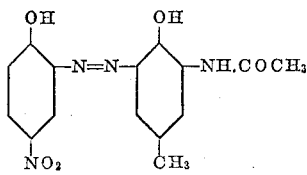

which is in dry state a dark powder easily soluble in water, dyeing animal fibres from an acid bath in brownish shades, which, when afterchromed become full brown and possess excellent fastness to light.

4. The chromatable azo dyestuff of the formula

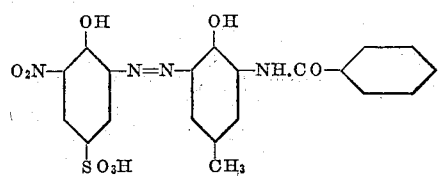

which is in dry state a dark powder easily soluble in water, dyeing animal fibres from an acid bath in violet-brown shades which when afterchromed, become dark brown and possess excellent fastness to light.

WALTER WEHRLI.